H. HOUSE.
SPRING SUSPENSION IN VEHICLES FOR ABSORBING ROAD SHOCKS.
APPLICATION FILED DEC. 9, 1913.
1,129,680.
Patented Feb. 23, 1915.
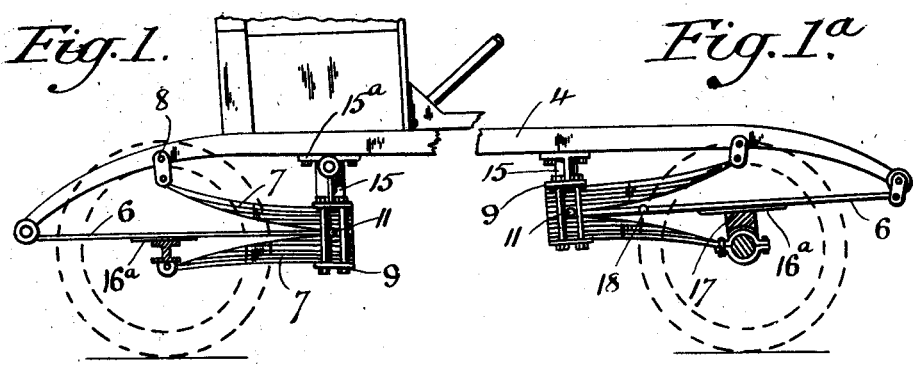
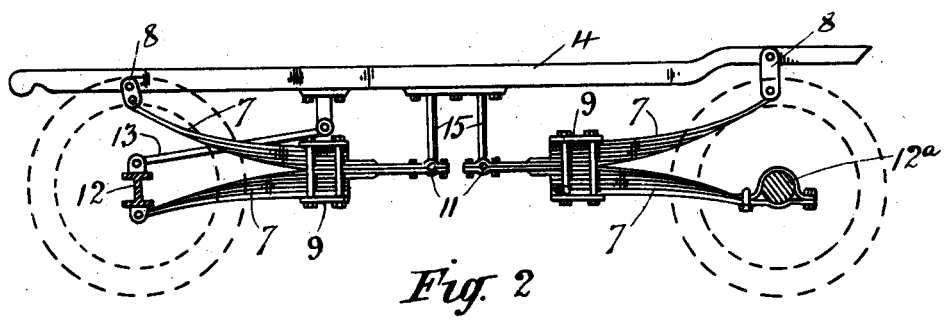
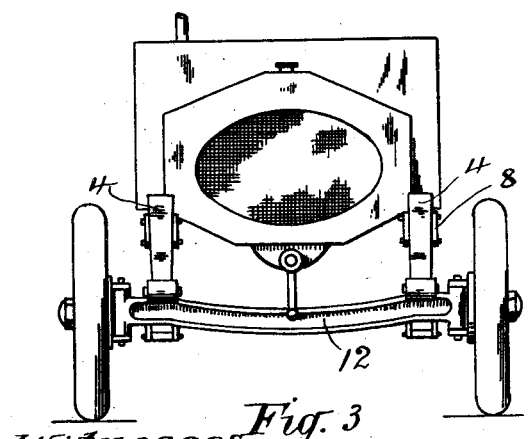
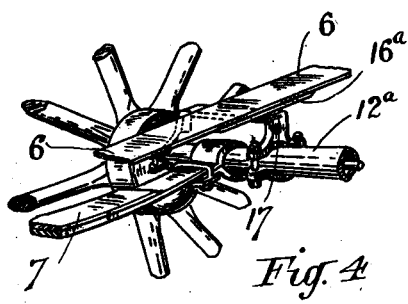

UNITED STATES PATENT OFFICE.

HERMAN HOUSE, OF MELBOURNE, VICTORIA, AUSTRALIA.

SPRING SUSPENSION IN VEHICLES FOR ABSORBING ROAD-SHOCKS.

1,129,680.  Specification of Letters Patent.  Patented Feb. 23, 1915.

Application filed December 9, 1913. Serial No. 805,571

*To all whom it may concern:*

Be it known that I, HERMAN HOUSE, a subject of the King of Great Britain, residing at Flinders Buildings, Flinders street, Melbourne, in the State of Victoria, Commonwealth of Australia, merchant, have invented new and useful Improvements in Spring Suspensions in Vehicles for Absorbing Road-Shocks, of which the following is a specification.

My invention relates to improvements in spring suspensions utilizable in vehicles, particularly those of the motor driven type such as motor cars and lorries, whereby the shocks upon the wheels of the car shall be more or less absorbed.

This invention is an improvement upon that for which I applied for a patent in the United States of America on the 30th day of July, 1912, Serial Number 712,306. In that specification I described a spring suspension, arranged near to each wheel of the vehicle, consisting of two leaf springs the thick ends of which are clamped together and bored horizontally and transversely to receive a pin upon the vehicle frame about which the said springs shall be capable, within certain limits, of turning. Both members of the spring flare in the same direction and the ends or tips thereof are attached the one to the vehicle frame through a shackle or link and the other to a wheel axle or axle casing.

In the present invention, I use in the spring a springy support resting on the axle and attached at one of its ends in the clamped end of the spring and at its other end to the extremity of the vehicle frame. I have also shown a means for supporting the clamped springs pivotally outside the springs which arrangement may be used with or without the springy support as will be hereinafter described.

In the accompanying drawing Figure 1 is a side elevation of part of the vehicle frame showing the flaring springs combined with the resilient horizontal supporting member. Fig. 1ª is a similar view of a different form of the invention. Fig. 2 is also a side elevation of my invention wherein the flaring springs are pivotally supported in brackets on the vehicle frame at the back of the main springs. Fig. 3 shows in front elevation a motor car fitted with my springs as in Fig. 1, and Fig. 4 is a perspective fragmentary view of the horizontal springy member and its connection with the axle.

On the chassis frame 4 on each side thereof near to a wheel I mount two leaf springs 7 which at their thick ends are securely held together in the clamps or holdfasts 9. The other ends or tips of the springs 7 are attached respectively the one to the frame 4 and the other to a wheel axle or axle casing, the tip of the upper spring being loosely connected through the shackle 8 which is itself attached in like manner to the frame, while the tip of the lower spring member will be attached to the axle 12 or to the axle casing 12ª.

The clamped springs are pivotally mounted in the vehicle frame, or to a bracket depending therefrom, on a pin 11 which projects horizontally and transversely and provides a center about which the clamped springs may have a limited rotary movement. The pin 11 is preferably in the lower end of the link 15 which is itself pivotally hung in the base plate 15ª· and together therewith constitutes a jointed or flexible bracket.

In Fig. 1 I have shown the front springs 7 pivoted to such a bracket and containing the supporting resilient member 6 which is composed of one or more leaves of flat steel and which, while being virtually horizontal, may have a slight camber, so as to present a slightly convex surface to the axle 12. In the figure, the member 6 is composed of but one leaf, but it is reinforced at the axle by a short leaf 16ª. To adapt the member 6 to the axle casing 12ª I secure to the casing a tabular clamp 17 upon which 6· will be secured clear of the adjacent parts of the suspension. The function of the spring 6 is to act as a support or torque to the axle, to give extra lateral stability and to assist to carry the load or to give an extra damping effect by acting as a snubber.

Referring now to Fig. 2 I may avoid transversely piercing the clamped ends of the springs by extending backward from the clamps 9 one or more of the inner leaves of the springs 7 and adapting the same to a pivotal mounting on the brackets 15.

I preferably utilize with this spring the torque rod 13 between a point on the axle or axle casing and the frame of the vehicle, but this may be dispensed with if the member 6 and the flexible bracket of Fig. 1 is employed in combination with the extended leaves.

When using the resilient member 6 in the springs 7 with the pivoted bracket 15, it may not be necessary to use a shackle or link at the point of connection of the member 6 with the frame 4, but when the bracket is rigid on the frame as in the case of the rear wheel (Fig. 1) the spring 6 must be shackled to the frame as indicated in the figure. The use and disposition of the pivoted brackets and shackles with the springs will in each case depend to some extent upon the design of chassis to which they are fitted, and the spring 6 may be hinged, if necessary, as shown at 18, to avoid undue strain thereon at its connection with the clamped springs.

The position of the hinged or flexible bracket relatively to the spring need not necessarily be as shown in Fig. 1, as it may, for instance, be placed behind the spring in the position of the rigid bracket of Fig. 2. In such case the inner leaves of the spring would be extended backward as shown to connect pivotally with the flexible bracket, and the springy member 6 would be secured to the axle and at one end to the extremity of the frame 4, if need be through a shackle, and at the other in the spring. When the above disposition is made the torque rod 13 will of course not be required.

Having now described my invention what I claim as new and desire to secure by Letters Patent is:—

1. In spring suspensions of the kind indicated, the combination with a pair of leaf springs having their thick ends clamped together and pivotally connected, through suitable means, to the frame of the vehicle while their tips flaringly project in the same direction and are connected one to the wheel axle and the other to the said frame through a shackle or link, of a springy member horizontally arranged and secured between the clamped end of the springs and the vehicle frame and upon the axle.

2. In spring suspensions of the kind indicated, a pair of flaring leaf springs clamped together at their thick ends and having their tips loosely connected to the vehicle frame and a wheel axle respectively, a flexible or hinged bracket upon the frame, a pivotal support in the lower end of the bracket coming through the clamped end of the spring and a horizontal springy member resting upon and secured to an axle and attached at one of its ends in the clamped springs and at the other to an extremity of the vehicle frame.

3. In spring suspensions of the kind indicated, a pair of flaring leaf springs clamped together at the thick ends at which part the spring is pivotally connected through suitable means to the vehicle frame, and having one tip loosely connected to the vehicle frame and the other tip to a wheel axle, in combination with a horizontal springy member upon an axle and secured at one of its ends in the clamped springs and at the other to an extremity of the vehicle frame.

4. In combination, a frame of a vehicle, an axle mounted under the frame, a pair of leaf springs having their thick ends clamped together, means connecting the thick ends of the leaf springs to the vehicle frame, the free ends of said springs flaring outwardly in opposite directions, a shackle pivotally connecting the free flaring end of one of said springs with the frame, a flat resilient spring interposed between the thick ends of the first mentioned springs and projecting therefrom, means for connecting the flat spring to the axle and means for pivotally connecting the free end of said flat spring with the frame.

5. In combination, a frame, an axle mounted under the frame, a pair of leaf springs having their thick ends clamped together, the free ends of said leaf springs flaring outwardly, means for securing the thick ends of said springs to the frame, a shackle securing the flaring end of one of said springs to the frame, means for pivotally securing the flaring end of the other of said springs to the axle, a flat spring interposed between the thick ends of the leaf springs and its free end extended beyond the plane of the ends of said leaf springs, means for connecting the flat spring to the axle and means for pivotally connecting the flat spring to the frame.

In testimony whereof I have signed my name to this specification in the presence of two subscribing witnesses.

HERMAN HOUSE.

Witnesses:
P. M. NEWTON,
A. C. SMITH.